(12) United States Patent
Hammer et al.

(10) Patent No.: US 11,631,554 B2
(45) Date of Patent: Apr. 18, 2023

(54) ON-LOAD TAP CHANGER AND LOCAL NETWORK TRANSFORMER HAVING AN ON-LOAD TAP CHANGER

(71) Applicant: Maschinenfabrik Reinhausen GmbH, Regensburg (DE)

(72) Inventors: Christian Hammer, Regensburg (DE); Andreas Sachsenhauser, Mallersdorf (DE); Riccardo Dalla Vecchia, Montecchio Maggiore (IT)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 442 days.

(21) Appl. No.: 16/975,740

(22) PCT Filed: Feb. 20, 2019

(86) PCT No.: PCT/EP2019/054209
§ 371 (c)(1),
(2) Date: Aug. 26, 2020

(87) PCT Pub. No.: WO2019/170417
PCT Pub. Date: Sep. 12, 2019

(65) Prior Publication Data
US 2020/0411254 A1 Dec. 31, 2020

(30) Foreign Application Priority Data
Mar. 6, 2018 (DE) ..................... 10 2018 105 097.6

(51) Int. Cl.
*H01H 9/00* (2006.01)

(52) U.S. Cl.
CPC ........ *H01H 9/0027* (2013.01); *H01H 9/0016* (2013.01); *H01H 9/0038* (2013.01)

(58) Field of Classification Search
CPC .. H01H 9/0027; H01H 9/0038; H01H 9/0016; H01H 9/0005; G05F 1/147; H01F 29/04
(Continued)

(56) References Cited

U.S. PATENT DOCUMENTS

| | | | |
|---|---|---|---|
| 3,673,364 A | 6/1972 | Klein | |
| 4,207,445 A * | 6/1980 | Hammar | H01H 9/0005 |
| | | | 200/11 TC |

(Continued)

FOREIGN PATENT DOCUMENTS

| | | |
|---|---|---|
| CN | 201430068 Y | 3/2010 |
| CN | 106653426 A | 5/2017 |

(Continued)

*Primary Examiner* — William A Bolton
(74) *Attorney, Agent, or Firm* — Leydig, Voit & Mayer, Ltd.

(57) ABSTRACT

An on-load tap changer has: a first selector rod and a second selector rod; a load changeover-switch rod; a switch; and a transmission. The first selector rod, the second selector rod and the load changeover-switch rod are arranged collinearly. The transmission is configured to: move the first selector rod and the second selector rod during changeover from one selector contact to an adjacent selector contact in a first direction; and move the load changeover-switch rod during the changeover in the first direction and a second direction, which is opposite to the first direction, so as to actuate the switch.

15 Claims, 6 Drawing Sheets

(58) Field of Classification Search
USPC .......................... 200/11 TC, 568, 16 C, 5 B
See application file for complete search history.

(56) References Cited

U.S. PATENT DOCUMENTS

| | | | | |
|---|---|---|---|---|
| 4,644,112 | A * | 2/1987 | Kranich, II | ............ H01H 15/08 |
| | | | | 200/279 |
| 5,191,179 | A * | 3/1993 | Yatchum | .............. H01H 9/0027 |
| | | | | 200/18 |
| 5,594,223 | A * | 1/1997 | Fukushi | ............... H01H 9/0038 |
| | | | | 218/120 |
| 6,060,669 | A | 5/2000 | Dohnal et al. | |
| 9,401,249 | B2 * | 7/2016 | Elick | .................... H01H 9/0044 |
| 9,762,161 | B2 * | 9/2017 | Pankofer | .............. H01H 9/0038 |
| 2012/0241300 | A1 * | 9/2012 | Brasher | ................... H01H 3/44 |
| | | | | 200/5 B |
| 2014/0159847 | A1 * | 6/2014 | Wrede | ................. H01H 9/0038 |
| | | | | 336/150 |
| 2015/0028978 | A1 | 1/2015 | Bieringer et al. | |
| 2015/0171783 | A1 | 6/2015 | Bieringer et al. | |
| 2019/0228922 | A1 | 7/2019 | Hammer et al. | |

FOREIGN PATENT DOCUMENTS

| | | |
|---|---|---|
| DE | 19743864 C1 | 4/1999 |
| DE | 102012103490 A1 | 10/2013 |
| DE | 102016117526 B3 | 2/2018 |
| WO | 2013185961 A1 | 12/2013 |

\* cited by examiner

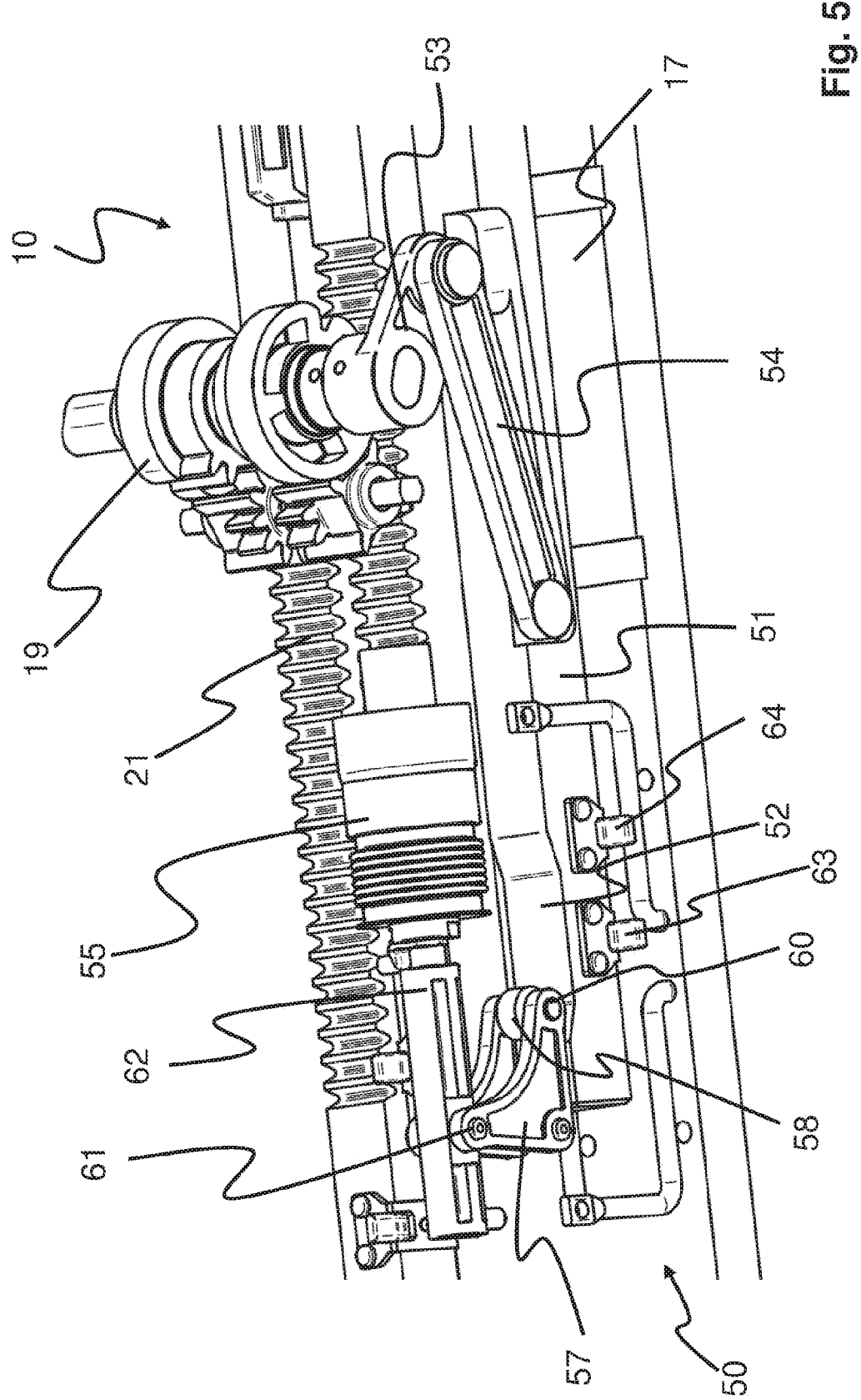

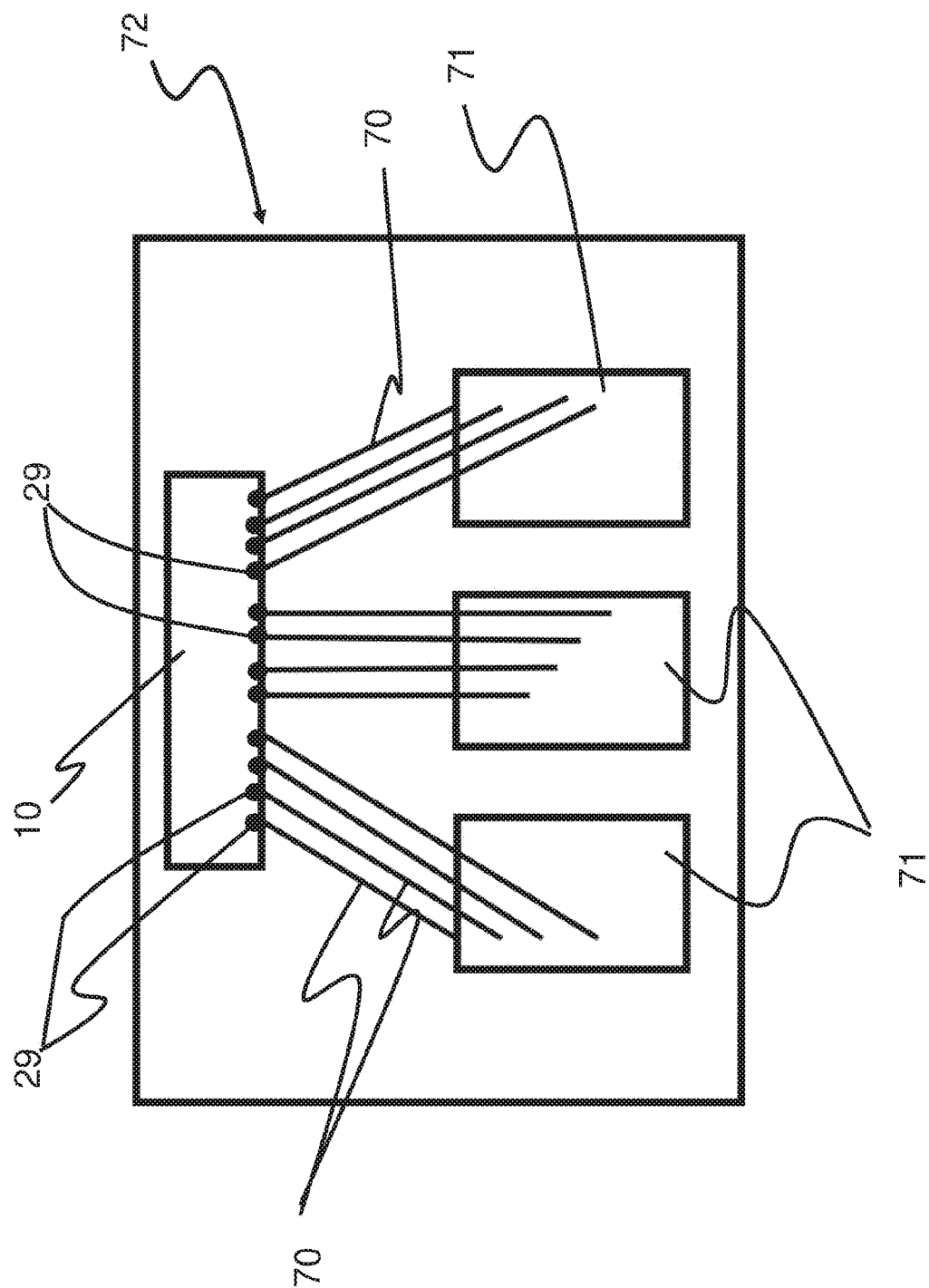

US 11,631,554 B2

ON-LOAD TAP CHANGER AND LOCAL NETWORK TRANSFORMER HAVING AN ON-LOAD TAP CHANGER

CROSS-REFERENCE TO PRIOR APPLICATIONS

This application is a U.S. National Phase Application under 35 U.S.C. § 371 of International Application No. PCT/EP2019/054209, filed on Feb. 20, 2019, and claims benefit to German Patent Application No. DE 10 2018 105 097.6, filed on Mar. 6, 2018. The International Application was published in German on Sep. 12, 2019, as WO 2019/170417 A1 under PCT Article 21(2).

FIELD

The invention relates to an on-load tap changer and to a local mains transformer with an on-load tap changer.

BACKGROUND

Regulation of local mains transformers is gaining increasing significance due to the rise in alternative energy producers such as, for example, wind power installations or photovoltaic installations, in low-voltage mains or medium-voltage mains. Conventional on-load tap changers used in high-voltage transformers are not suitable for local mains transformers, even if just due to their size.

SUMMARY

An embodiment of the present invention provides an on-load tap changer that has: a first selector rod and a second selector rod; a load changeover-switch rod; a switch; and a transmission. The first selector rod, the second selector rod and the load changeover-switch rod are arranged collinearly. The transmission is configured to: move the first selector rod and the second selector rod during changeover from one selector contact to an adjacent selector contact in a first direction; and move the load changeover-switch rod during the changeover in the first direction and a second direction, which is opposite to the first direction, so as to actuate the switch.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 5 illustrates a form of embodiment of actuation of a switching means; and

FIG. 6 illustrates a local mains transformer with an on-load tap changer.

DETAILED DESCRIPTION

Figure 1:
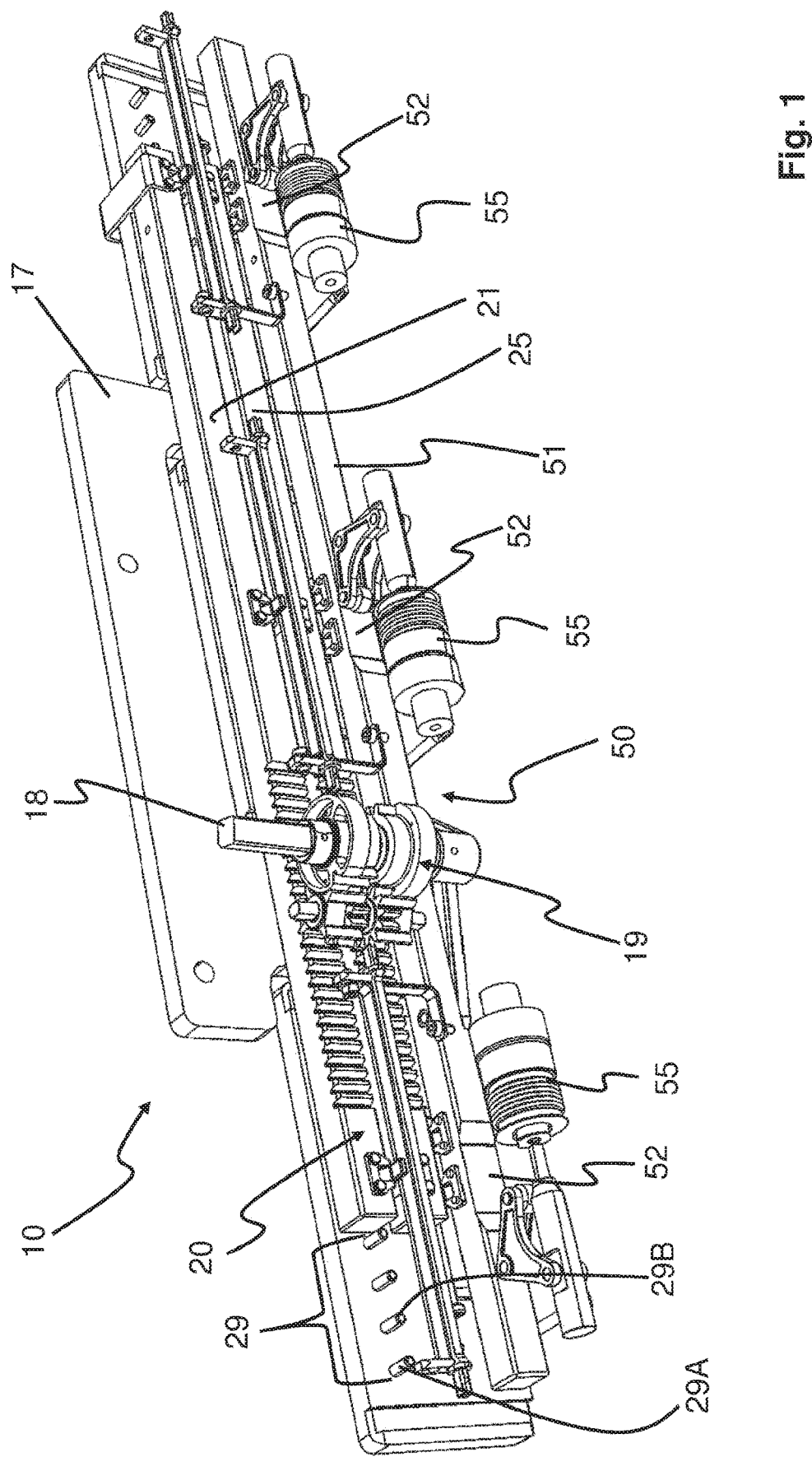
FIG. 1 illustrates an on-load tap changer according to the invention.

Embodiments of the present invention provide a particularly compact and reliable on-load tap changer for tapped transformers, particularly local mains transformers, as well as a local mains transformer with an on-load tap changer.

An embodiment of the present invention provides an on-load tap changer, which includes:
a first selector rod and a second selector rod;
a load changeover-switch rod;
a switching means; and
a transmission;
wherein:
the first selector rod, the second selector rod and the load changeover-switch rod are arranged collinearly; and
the transmission is arranged for the purpose of:
  moving the selector rods during changeover from one selector contact to an adjacent selector contact in a first direction; and
  moving the load changeover-switch rod during the changeover in the first direction and a second direction which is opposite to the first direction so as to actuate the switching means.

The on-load tap changer according to embodiments of the invention comprises two selector rods, which simulate the construction of a tap changer, and thereby enable a compact mode of construction. A possibility is therefore created of rapidly and reliably performing changeovers under load, i.e. during operation of the tapped transformer, in a simple, economic and space-saving manner by a load changeover-switch rod. In that case, the transmission of the on-load tap changer makes it possible to move the selector rods and the load changeover-switch rod at the correct time and to perform a changeover. In order to make possible a particularly compact mode of construction the load changeover-switch rod is, for actuation of the switching means, moved in a first direction and a second direction opposite the first direction. The selector rods and the load changeover-switch rod are in that case arranged to be collinear. This configuration also allows space-saving arrangement of all parts of the on-load tap changer and in that case guarantees functionality and a high level of reliability. The selector rods and/or the load changeover-switch rod can each be of single-part or multi-part construction.

According to at least one form of embodiment, the transmission comprises a first drive input pinion and a first drive output pinion, wherein a drive shaft moves the first selector rod by way of the first drive input pinion and the first drive output pinion during the changeover.

According to at least one form of embodiment, the transmission comprises a second drive input pinion and a second drive output pinion, wherein the drive shaft moves the second selector rod by way of the second drive input pinion and the second drive output pinion during the changeover.

According to at least one form of embodiment, the transmission comprises a crank and a connecting rod, wherein the drive shaft moves the load changeover-switch rod by way of the crank and the connecting rod and thus actuates the switching means during the changeover. However, the switching means can also be designed to be actuable directly by way of the load changeover-switch rod.

Moreover it can be provided that:
the load changeover-switch rod has a cam profile,
the switching means is mechanically connected with a deflecting lever,
the switching means is actuated by way of the deflecting lever and the cam profile during the changeover.

According to at least one form of embodiment, the deflecting lever travels at least partly along the cam profile during actuation of the switching means. For that purpose the deflecting lever can comprise a roller.

Moreover, it can be provided that the transmission is arranged for the purpose of actuating a further switching means during the changeover. In that case the load changeover-switch rod can comprise the further switching means. The further switching means can comprise at least one contact and be constructed as a bridge switch.

In addition, it can be provided that the transmission is arranged for the purpose of moving the first selector rod in the first direction during the changeover, thereafter moving the load changeover-switch rod in the first and the second direction and thereafter moving the second selector rod in the first direction.

Furthermore, it can be provided that the transmission is arranged for the purpose of moving the load changeover-switch rod several times in the first direction and/or several times in the second direction during the changeover.

Further, it can be provided that the changeover-switch rod opens and closes the switching means during the changeover.

Moreover, it can be provided that the transmission is constructed as a Geneva transmission.

In addition, the base plate, and/or drive shaft, and/or transmission, and/or the selector rods, and/or the drive input pinon, and/or the drive output pinion, and/or the load changeover-switch rod, and/or the crank, and/or the connecting rod, and/or the deflecting lever, and/or the roller can be constructed from an electrically non-conductive material such as, for example, synthetic resin-bonded paper or glass fibre.

According to an embodiment of the invention, a local mains transformer, which comprises an on-load tap changer according to the invention, is provided.

An on-load tap changer 10 with a selector 20 and a load changeover switch 50 are illustrated in FIG. 1. The on-load tap changer 10 is actuated by means of a drive shaft 18 by way of transmission 19. In that case, the selector 20 comprises a first selector rod 21 and a second selector rod 25. The load changeover switch 50 comprises a load changeover-switch rod 51. Because the illustrated form of embodiment of the on-load tap changer is of three-phase configuration, the load changeover switch 50 comprises a respective switching means 55 for each phase. Each switching means 55 can be constructed as a vacuum interrupter, as a semiconductor switch, or from simple contacts. The drive shaft 18 moves the first and second selector rods 21, 25 as well as the load changeover-switch rod 51 by way of the transmission 19. The load changeover switch 50 and the selector 20 are arranged on a base plate 17. In addition, a plurality of selector contacts 29 are mounted in a base plate 17. The selector contacts 29 are connected with winding taps 70, which are not shown here, of a regulating winding 71 of a tapped transformer 72, particularly a local mains transformer.

Figure 2:
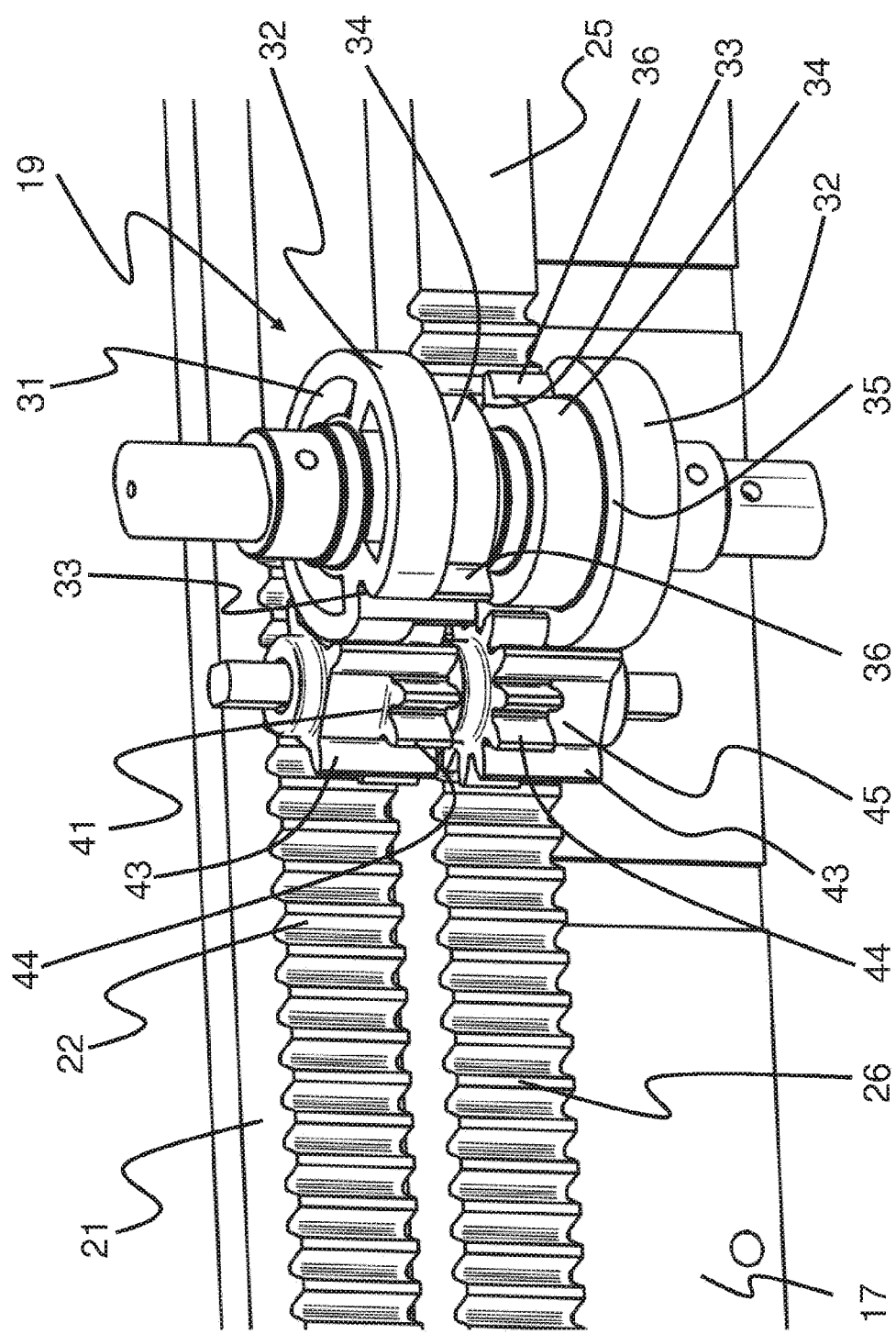
FIG. 2 illustrates a form of embodiment of a transmission in the on-load tap changer.

In FIG. 2, the transmission 19 is depicted in the region of the selector 20 with a first drive input pinion 31 and a second drive input pinion 35 as well as a first drive output pinion 41 and a second drive output pinion 45. In addition, it can be seen that the first and second selector rods 21, 25 each have a toothed region 22 or 26 on a side facing the transmission.

Figure 3:
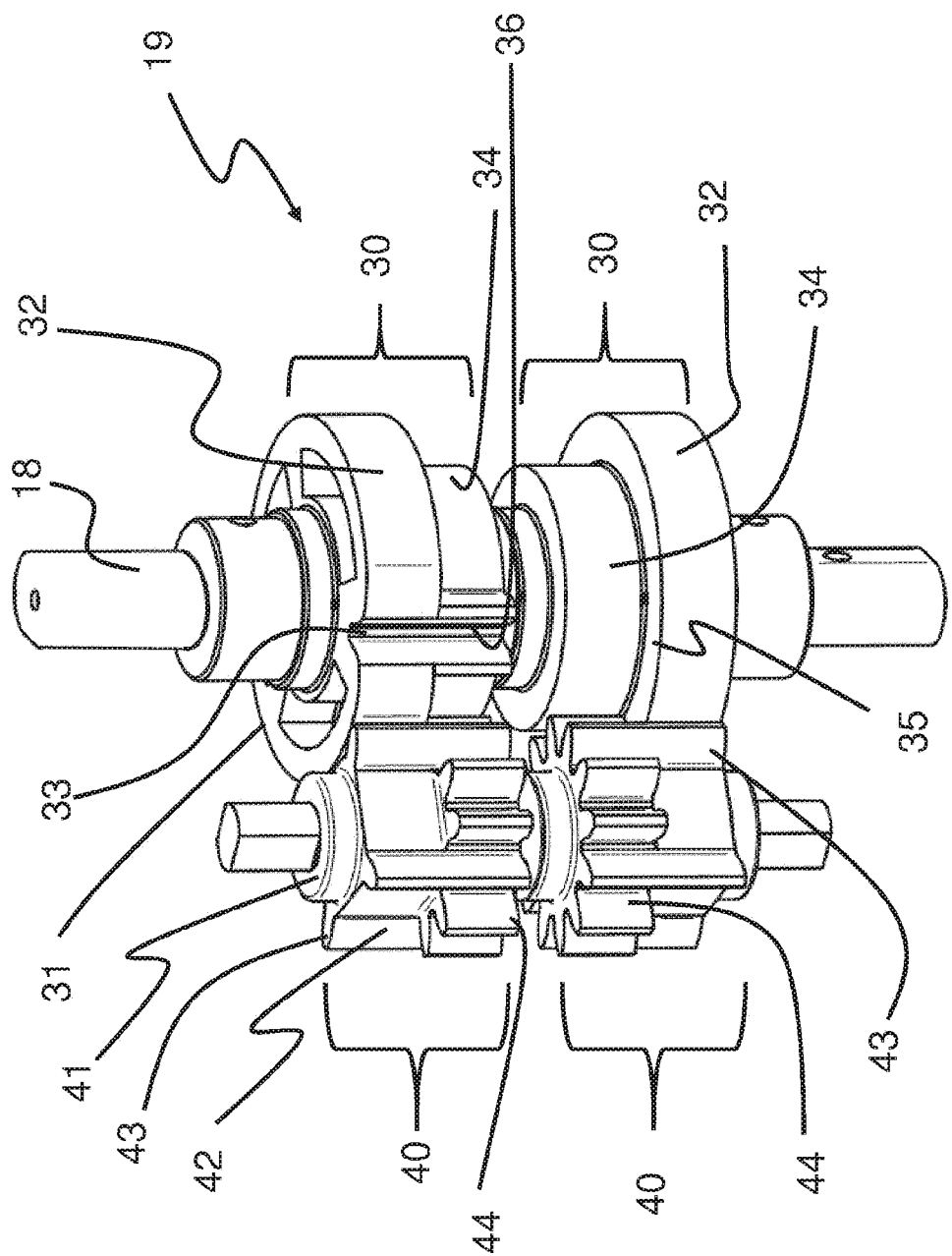
FIG. 3 illustrates a detailed view of the transmission.

A detailed view of the transmission 19 is illustrated in FIG. 3. The outer surface 30 of the first drive input pinion 31 is divided into two parts 32, 34. The first part 32 of the outer surface 30 has a notch 33 and the second part 34 has two teeth 36, wherein the notches 33 of the first part 32 run between the two teeth 36 of the second part 34. This applies analogously to the second drive input pinion 35. The drive input pinions 31 and 35 are arranged in mirror image to one another on the drive shaft 18.

The outer surface 40 of the drive output pinon 41 is divided into two parts 42 and 44. The first part 42 has four symmetrically distributed teeth 43. The drive output pinon 41 is uniformly toothed in the second part 44. The four symmetrically distributed teeth 43 go over homogenously into the second toothed part. This applies analogously to the second drive output pinon 45. The drive output pinons 41 and 45 are in operative connection with the selector rods 21 and 25 by way of the partly toothed regions 22 and 26.

The transmission 19 makes it possible to move the selector rods 21 and 25 in a first direction during a changeover from a selector contact 29A to an adjacent selector contact 29B (see FIG. 1). In the case of a following changeover, the selector rods 21 and 25 are moved either in the same first direction or a second, opposite direction, thus from the selector contact 29B to the adjacent selector contact 29A.

The combination consisting of a selector rod 21 and 25, a drive output pinion 41 and 45 and a drive input pinion 31, 36 makes it possible to convert the continuous rotational movement of the drive shaft 18 into a linear and/or stepped movement of the selector rod 21 and 25 in a first direction. Due to the fact that the first and second drive input pinions 31 and 35 are arranged on the drive shaft 18 to be offset relative to one another a movement of the two selector rods 21 and 25 offset in time relative to one another takes place. Moreover, the respective first parts 32, 42 of the drive input pinons 31, 35 and the drive output pinions 41, 45 prevent movement of the respective selector rod 21, 25 outside of a changeover. The outer surfaces 30 with the notch 33 of the drive input pinion 31, 35 and the four teeth 43 of the drive output pinon 41, 45 create security against twisting. The transmission 19 can also be constructed as a Geneva transmission.

Figure 4:
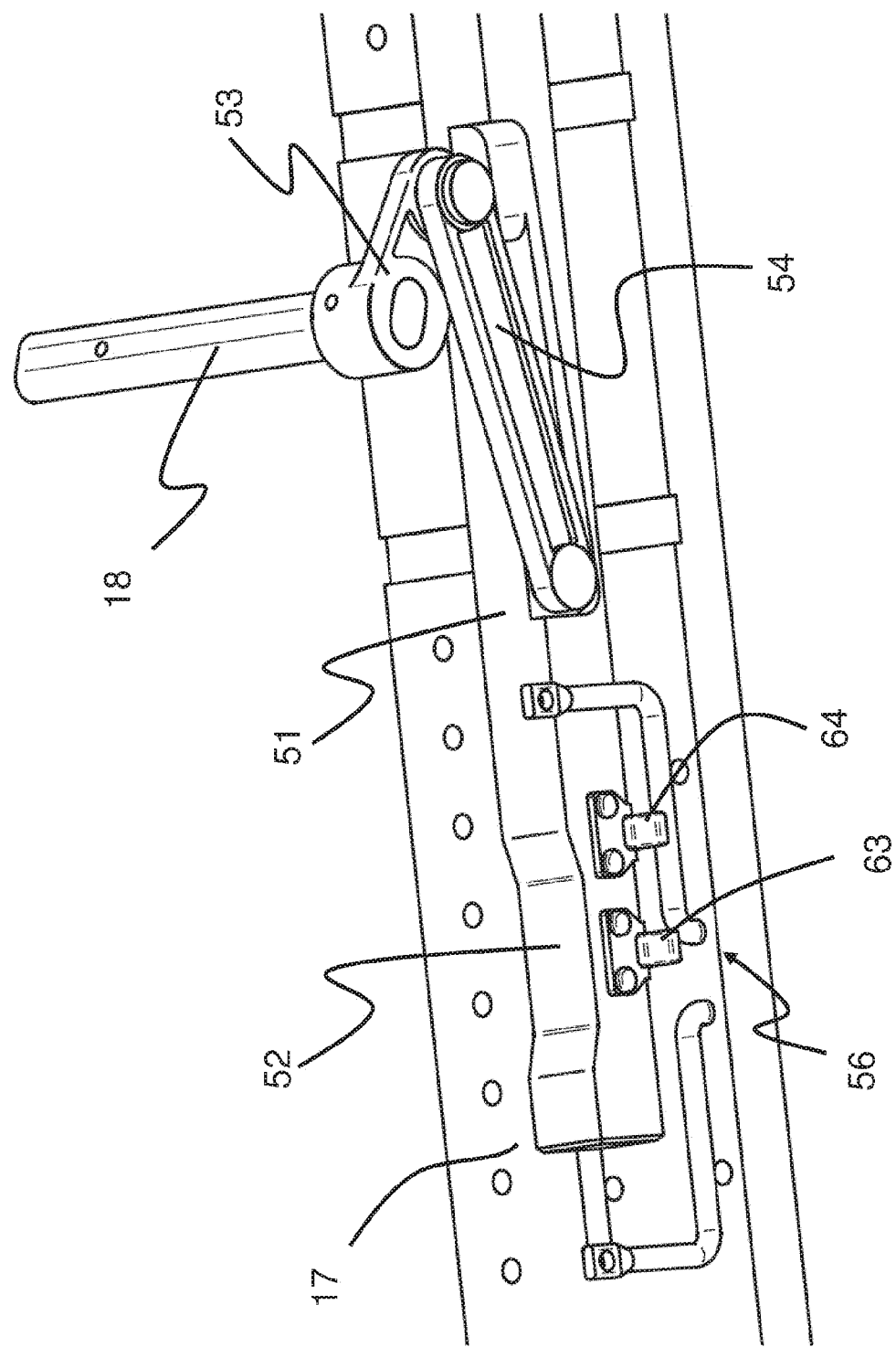
FIG. 4 illustrates a further detailed view of the transmission.

The drive shaft 18 with a crank 53 and a connecting rod 54 is illustrated in FIG. 4. The connecting rod 54 is mechanically connected at a first end with the crank 53 and at a second end with the load changeover-switch rod 51. Through rotation of the drive shaft 18, the load changeover-switch rod 51 is moved by way of the crank 53 and the connecting rod 54 during the changeover in the first direction and in a second direction opposite the first direction. As a result, in the case of changeover from one selector contact 29A to an adjacent selector contact 29B the selector rods 21, 25 are thus moved in a first direction and the load changeover-switch rod 51 is moved in the first direction and in the second direction opposite the first direction.

In other words, the first selector rod 21 and the second selector rod 25 are arranged parallelly in a plane, the first selector rod 21 and the load changeover-switch rod 51 are arranged parallelly in a plane and the second selector rod 25 and the load changeover-switch rod 51 are arranged parallelly in a plane; that means collinearly.

In the case of changeover, the selector rods 21, 25 are moved with an offset in time in a first direction, i.e. to the right or left or upwardly or downwardly. By contrast, the load changeover-switch rod 51 in the case of a changeover is moved in a first direction and a second direction opposite to the first direction, i.e. to the right and left or, conversely upwardly or downwardly, or conversely.

However, the load changeover-switch rod 51 can also be moved several times in the first or the second direction during a changeover. In that case, the multiple directional change takes place constantly in succession.

Further, it is possible to actuate the load changeover-switch rod 51 by way of a partly toothed transmission and/or a Geneva transmission via the drive shaft 18.

The load changeover-switch rod 51 has, for actuation of each switching means 55, a cam profile 52. In the form of embodiment described here the load changeover-switch rod 51 has three cam profiles 52. The cam profile 52 serves for actuation of the switching means 55, in this example actuation of a vacuum interrupter. Moreover, the load changeover-switch rod 51 actuates a further, second switching means 56. This further or second switching means 56 is constructed as a bridge switch and comprises a first contact 63 and a second contact 64. In that case, the contacts 63, 64 are mechanically connected with the load changeover-switch rod 51.

A form of embodiment of the load changeover switch 50 for actuation of the switching means 55 and the second switching means 56 is illustrated in FIG. 5. In that case a deflecting lever 57 is arranged between the load changeover-switch rod 51 and the switching means 55 to be rotatably mounted. A first end 60 of the deflecting lever 57 has a roller 58 which at least partly travels along the cam profile 52 during the movement of the load changeover-switch rod 51. The second end 61 of the deflecting lever 57 is mechanically connected with the switching means 55. In the form of embodiment shown here the movable contact 62 of the switching means 55, which is constructed as a vacuum interrupter, is moved and the vacuum interrupter closed or opened. The actuation of the switching means 55 can also take place directly by way of the load changeover-switch rod 51. In that case, a roller 58 which through movement along the cam profile 52 opens or closes the vacuum interrupter would be mounted on the movable contact 62 of the switching means 55.

The second switching means 56 is actuated in parallel therewith. In that case, the contacts 63, 64, which are secured to the load changeover-switch rod 51, of the bridge switch are pushed against fixed contacts or separated therefrom.

When the load changeover switch 50 is actuated the load changeover-switch rod 51 is thus moved once or several times in a first and second direction. The switching means 55, 56 are then actuated once or several times, i.e. opened or closed or fixed contacts are bridged by pushing on or separated by detaching. That is dependent on the changeover sequence.

The base plate 17, and/or the drive shaft 18, and/or transmission 19, and/or the selector rods 21, 25, and/or the drive input pinion 31/35, and/or the drive output pinion 41/45, and/or the load changeover-switch rod 51, and/or the crank 53, and/or the connecting rod 54, and/or the deflecting lever 57, and/or the roller 58, is or are of an electrically non-conductive material such as, for example, synthetic resin-bonded paper or glass fibre.

FIG. 6 shows a schematic illustration of a tapped transformer 72, particularly local mains transformer, with the on-load tap changer 10 according to the invention. The selector contacts 29 are connected with winding taps 70 of a regulating winding 71.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS 10 on-load tap changer
17 base plate
18 drive shaft
19 transmission
20 selector
21 first selector rod
22 toothed region of 21
25 second selector rod
26 toothed region of 25
29 selector contacts
29A selector contacts
29B selector contacts
30 outer surface of 31/35
31 first drive input pinion
32 first part of 30
33 notch
34 second part of 30
35 second drive input pinion
36 teeth of 31/35
40 outer surface of 41/45
41 first drive output pinion
42 first part of 40
43 four teeth
44 second part of 40
45 second drive output pinon
50 load changeover switch
51 load changeover-switch rod
52 cam profile
53 crank
54 connecting rod
55 switching means
56 further or second switching means
57 deflecting lever
58 roller
60 first end of 57
61 second end of 57
62 movable contact
63 first contact of 56
64 second contact of 56
70 winding taps
71 regulating winding 72 tapped transformer/local mains transformer

The invention claimed is:

1. An on-load tap changer comprising:
a first selector rod and a second selector rod;
a load changeover-switch rod;
a switch; and
a transmission,
wherein the first selector rod, the second selector rod and the load changeover-switch rod are arranged collinearly, and
wherein the transmission is configured to:
move the first selector rod and the second selector rod during changeover from one selector contact to an adjacent selector contact in a first direction; and
move the load changeover-switch rod during the changeover in the first direction and a second direction, which is opposite to the first direction, so as to actuate the switch.

2. The on-load tap changer according to claim 1,
wherein the transmission comprises a first drive input pinion and a first drive output pinion, and
wherein a drive shaft moves is configured to move the first selector rod by way of the first drive input pinion and the first drive output pinion during the changeover.

3. The on-load tap changer according to claim 1,
wherein the transmission comprises a second drive input pinion and a second drive output pinion, and
wherein the drive shaft is configured to move the second selector rod by way of the second drive input pinion and the second drive output pinion during the changeover.

4. The on-load tap changer according to claim 1,
wherein the transmission comprises a crank and a connecting rod, and
wherein the drive shaft is configured to move the load changeover-switch rod by way of the crank and the connecting rod and thus actuates the switch during the changeover.

5. The on-load tap changer according to claim 1,
wherein the load changeover-switch rod has a cam profile,
wherein the switch is mechanically connected with a deflecting lever, and
wherein the switch is configured to be actuated by way of the deflecting lever and the cam profile during the changeover.

6. The on-load tap changer according to claim 5,
wherein the deflecting lever travels is configured to travel at least partly along the cam profile during actuation of the switch.

7. The on-load tap changer according to claim 1,
wherein the transmission is configured to actuate a further switch during the changeover.

8. The on-load tap changer according to claim 7,
wherein the load changeover-switch rod comprises the further switch.

9. The on-load tap changer according to claim 7,
wherein the further switch comprises at least one contact which is configured as a bridge switch.

10. The on-load tap changer according to claim 1,
wherein the transmission is configured to move the first selector rod in the first direction during the changeover, thereafter move the load changeover-switch rod in the first and second directions, and thereafter move the second selector rod in the first direction.

11. The on-load tap changer according to claim 1,
wherein the transmission is configured to move the load changeover-switch rod several times in the first direction or several times in the second direction during the changeover.

12. The on-load tap changer according to claim 1,
wherein the load changeover-switch rod is configured to open and close the switch during the changeover.

13. The on-load tap changer according to claim 1,
wherein the transmission is configured as a Geneva transmission.

14. The on-load tap changer according to claim 1, comprising:
a load-changeover switch comprising:
three switches, which are constructed as vacuum interrupters,
three further switches, which are constructed as bridge switches, and
the load changeover-switch rod,
a selector comprising:
the first selector rod and the second selector rod;
the transmission which is configured to:
actuate the load changeover switch and the selector.

15. A local mains transformer comprising the on-load tap changer according to claim 1.

* * * * *